UNITED STATES PATENT OFFICE.

R. B. FITTS, OF PHILADELPHIA, PENNSYLVANIA.

IMPROVED PROCESS FOR TREATING AND COMPOUNDING MARL.

Specification forming part of Letters Patent No. 47,941, dated May 30, 1865.

*To all whom it may concern:*

Be it known that I, R. B. FITTS, of the city of Philadelphia, in the State of Pennsylvania, have invented a new and useful mode of Treating and Compounding Marl with Night-Soil and other Fertilizing Substances; and I do hereby declare that the following is full and exact description of the same.

The nature of my invention consists in the employment, first, of sulphuric acid in combination with semi-fluid night-soil in the treatment of marl for the twofold purpose of fixing the ammonia of the night-soil and for liberating carbonic acid from the marl, and thus rendering it more intimately mixable with the said night-soil; and, second, in adding to the said compound of marl, night-soil, and sulphuric acid certain proportions of "salt-cake," gas-lime, and animal charcoal, which are the refuse of chemical works, for the purpose of improving the fertilizing quality of the said marl and acidulated night-soil compound.

To enable others to understand and practice my said invention, I will proceed to describe it in more full and exact terms.

I take fifteen pounds of semi-fluid night-soil, and add thereto five pounds of sulphuric acid, mixing them intimately together. I then add about one hundred pounds of marl, and intimately mix the whole together, and during which latter operation the surplus or free sulphuric acid in the night-soil, after the ammonia has been fixed, combines chemically with the carbonate of lime of the marl, liberates its carbonic acid, and thus aerating the mass and separating the adherent particles of the marl, so as to render the same more intimately mixable with the night-soil. I now let the mass remain undisturbed for a day or two, or until the sulphuric acid has become neutralized, and then add five pounds of powdered salt-cake and fifteen pounds each of powdered animal charcoal and gas - lime, both being the refuse of chemical works, and mix the whole thoroughly together; and, finally, when sufficiently dry, grind and put it into sacks or casks for transportation and use.

The combination first described, consisting of the marl, night-soil, and acid, is well adapted for improving sandy soils without the addition of the salt - cake, gas - lime, and charcoal, and may be so used; but the addition of the latter two substances is for the purpose of improving the fertilizing qualities of the former without adding much to its cost. In fact, the whole is much cheaper and quite as beneficial to soils generally as the best Peruvian guano.

Having thus described my invention, what I claim as new therein, and desire to secure by Letters Patent, is—

1. The employment of sulphuric acid, in combination with night-soil, for acting upon the marl, substantially in the manner described, and for the purpose specified.

2. In combination with the marl, night-soil, and acid, treated as described, the addition of the salt-cake, gas-lime, and animal charcoal, substantially in the proportions and manner described, for the purpose specified.

R. B. FITTS.

Witnesses:
W. L. MANDERSON,
GEO. P. FITTS.